United States Patent
Ytterstrom

(10) Patent No.: US 7,275,118 B2
(45) Date of Patent: Sep. 25, 2007

(54) INPUT/OUTPUT (I/O) DEVICE DRIVER LOADING METHOD FOR DATA PROCESSING SYSTEM OF COMPUTER, INVOLVES COMMUNICATING SECONDARY I/O DEVICE DRIVER TO DATA PROCESSING SYSTEM USING PRIMARY I/O DEVICE DRIVER

(75) Inventor: Mikael Ytterstrom, Jarfalla (SE)

(73) Assignee: Sony Ericsson Mobile Communications AB (SE)

( * ) Notice: Subject to any disclaimer, the term of this patent is extended or adjusted under 35 U.S.C. 154(b) by 520 days.

(21) Appl. No.: 10/849,272

(22) Filed: May 19, 2004

(65) Prior Publication Data

US 2005/0262271 A1 Nov. 24, 2005

(51) Int. Cl.
*G06F 3/00* (2006.01)
*G06F 13/12* (2006.01)
*G06F 13/38* (2006.01)
*G06F 13/00* (2006.01)

(52) U.S. Cl. .................... 710/8; 710/62; 719/321; 719/327

(58) Field of Classification Search ........ 719/321–327; 710/8
See application file for complete search history.

(56) References Cited

U.S. PATENT DOCUMENTS 7,020,881 B2 * 3/2006 Takahashi et al. .......... 719/322
2001/0005846 A1 * 6/2001 Barney et al. ............... 707/1
2003/0046447 A1 * 3/2003 Kouperchliak et al. ..... 709/321
2003/0048473 A1 3/2003 Rosen
2003/0195737 A1 10/2003 Shapiro et al.
2003/0196007 A1 * 10/2003 Baron ......................... 710/13
2004/0073912 A1 * 4/2004 Meza .......................... 719/321

FOREIGN PATENT DOCUMENTS

EP 0 716 371 6/1996

OTHER PUBLICATIONS

International Search Report and Written Opinion of the International Searching Authority for International Patent Application No. PCT/EP2005/005257 mailed on Sep. 12, 2005.

* cited by examiner

*Primary Examiner*—Donald Sparks
*Assistant Examiner*—Brooke J Dews
(74) *Attorney, Agent, or Firm*—Myers Bigel Sibley & Sajovec, P.A.

(57) ABSTRACT

Methods, peripheral devices, and computer program products are provided for loading I/O device drivers from a peripheral device to a data processing system. First device identification information is communicated from the peripheral device to the data processing system. The first device identification information corresponds to a first I/O device driver in the data processing system. A second I/O device driver is communicated from the peripheral device to the data processing system using the first I/O device driver in the data processing system. Second device identification information is communicated from the peripheral device to the data processing system. The second device identification information corresponds to the second I/O device driver.

20 Claims, 3 Drawing Sheets

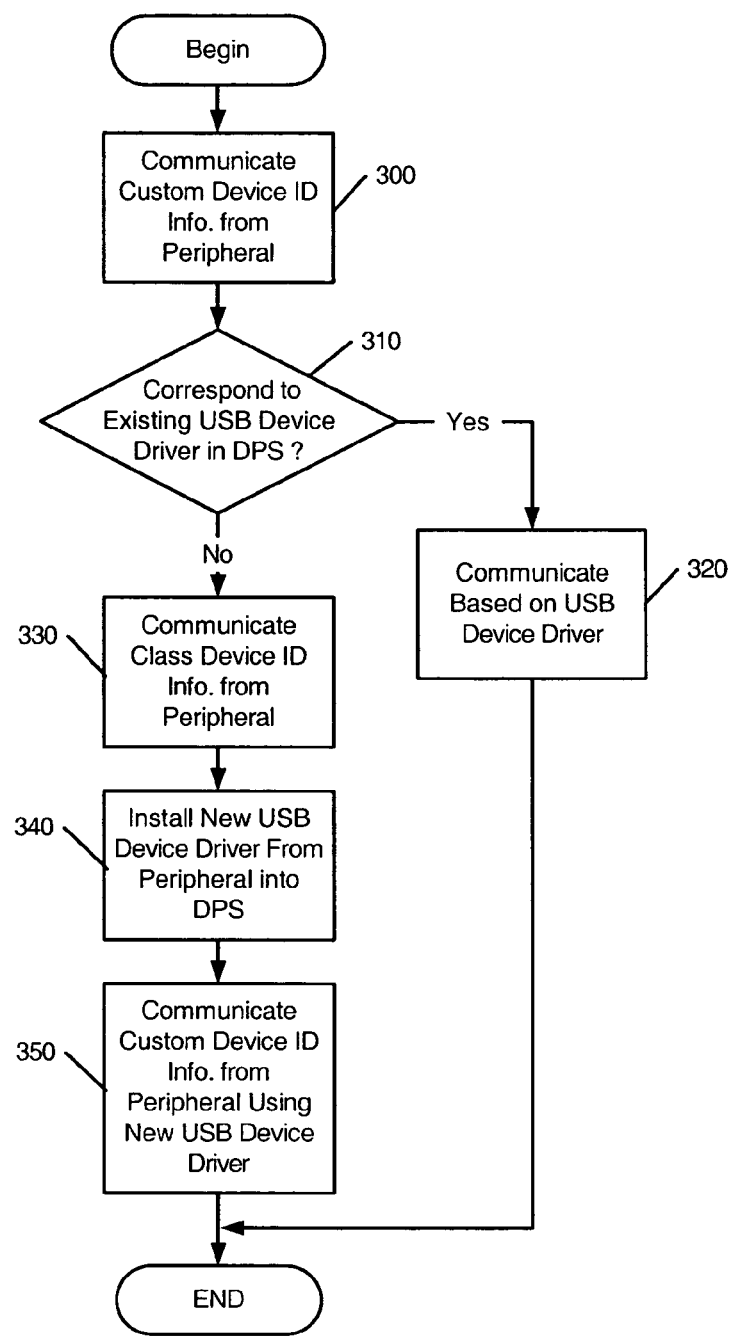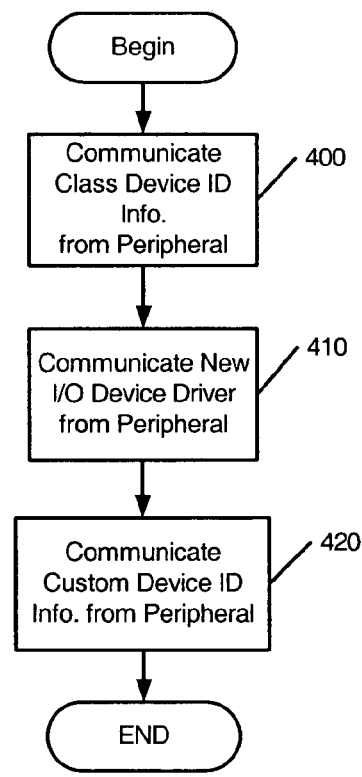

INPUT/OUTPUT (I/O) DEVICE DRIVER LOADING METHOD FOR DATA PROCESSING SYSTEM OF COMPUTER, INVOLVES COMMUNICATING SECONDARY I/O DEVICE DRIVER TO DATA PROCESSING SYSTEM USING PRIMARY I/O DEVICE DRIVER

FIELD OF THE INVENTION

The present invention relates to electronic systems and more particularly to I/O device drivers that are used by data processing systems to communicate with peripheral devices.

BACKGROUND OF THE INVENTION

The Universal Serial Bus (USB) has become a wide-used network for communication between computers and peripheral devices, such as, for example, printers, scanners, storage devices, digital cameras, and personal digital assistants (PDAs). One reason for the success of USB is that peripheral devices can sometimes be automatically recognized and a communication interface automatically setup when they are connected to a computer via a USB network.

By a process called USB enumeration, when a computer detects that a peripheral device has been plugged into, or powered-up on, a USB network, it requests identification information from the peripheral device. The identification information can include an identification of a class of the peripheral device (e.g., storage device, human interface device, printing device) and identification of a vendor and/or device model number. The computer then attempts to locate an existing USB device driver within its memory that corresponds to the identification information.

When an existing USB device driver is available, the computer can automatically configure the USB device driver for use with the peripheral device, and thereby allow use of the peripheral device with the computer. However, when an existing USB device driver is not available, the computer can prompt a user to supply a custom USB device driver for the peripheral device. Peripheral devices that need a custom USB device driver are generally supplied with the driver on a compact disk (CD) read-only memory (ROM). The custom USB device driver can then be loaded into the computer via the CD-ROM. Once a computer is setup with the custom USB device driver, the peripheral device can be automatically recognized and configured for use with the computer when it is plugged into or power-up on the USB network.

Although the CD-ROM with the custom USB device driver may not be needed once the custom USB device driver is installed on a computer, a user generally must keep the CD-ROM in case the peripheral device is to be connected to another computer. Besides the possible inconvenience of retaining the CD-ROM with the peripheral device, the CD-ROM can add to the cost of the peripheral. Moreover, some computers do not have a CD-ROM drive, or they may provide a CD-ROM drive only as a peripheral device, through, for example, a docking station. Accordingly, the burden that may be placed on a user to setup a USB connection between a computer and a peripheral device may be relatively high when the peripheral device does not correspond to an existing USB device driver in the computer.

SUMMARY OF THE INVENTION

Some embodiments of the present invention provide a method of loading an I/O device driver from a peripheral device to a data processing system. First device identification information is communicated from the peripheral device to the data processing system. The first device identification information corresponds to a first I/O device driver in the data processing system. A second I/O device driver is communicated from the peripheral device to the data processing system using the first I/O device driver in the data processing system. Second device identification information is communicated from the peripheral device to the data processing system. The second device identification information corresponds to the second I/O device driver.

In some further embodiments of the present invention, further communications between the peripheral device and the data processing system are carried out using the second I/O device driver. The first I/O device driver in the data processing system is a predefined USB class driver, the first device identification information identifies the peripheral device as corresponding to the predefined USB class driver in the data processing system, and the second I/O device driver includes a custom USB driver that is communicated using the predefined USB class driver. The second device identification information identifies the peripheral device as corresponding to the custom USB driver in the data processing system.

In some further embodiments of the present invention, the predefined USB class driver includes a USB storage class driver, the first device identification information identifies the peripheral device as a storage device that corresponds to the USB storage class driver, and the custom USB driver is communicated to the data processing system using the USB storage class driver. Communication of the custom USB driver to the data processing system can include installing the custom USB driver into a memory of the data processing system, which can include loading an executable file from the peripheral device into the data processing system and running the executable file to install the custom USB driver into a memory of the data processing system.

In some further embodiments of the present invention, communication of the custom USB driver to the data processing system can include displaying to a user an executable file that is on the peripheral device, and causing the executable file to be executed by the data processing system based on one or more selections by a user. The executable file installs the custom USB driver in the data processing system.

In some further embodiments of the present invention, the predefined USB class driver includes a USB storage class driver, the first device identification information identifies the peripheral device as a storage device that corresponds to the USB storage class driver. The custom USB driver is communicated to the data processing system by displaying to a user an executable file that is on the peripheral device in a window formed by an operating system within the data processing system. The executable file is executed by the data processing system based on a selection by a user. The executable file installs the custom USB driver in the data processing system.

In some further embodiments of the present invention, the peripheral device communicates the first device identification information to the data processing system based on a determination that the data processing system does not have an I/O device driver that corresponds to the second device identification information. The second device identification information is communicated from the peripheral device to the data processing system, and a determination is made as to whether the data processing system has an I/O device driver that corresponds to the second device identification information. The first device identification information is communicated to the data processing system based on the determination.

Some other embodiments of the present invention provide a peripheral device that includes an I/O interface and a controller. The I/O interface is configured to communicate information to a data processing system. The controller is configured to communicate first device identification information to a data processing system via the I/O interface, where the first device identification information corresponds to a first I/O device driver in the data processing system. The controller is also configured to communicate a second I/O device driver to the data processing system via the I/O interface based on the first I/O device driver in the data processing system, and is configured to communicate second device identification information to the data processing system via the I/O interface. The second device identification information corresponds to the second I/O device driver.

In some further embodiments of the present invention, the controller is configured to communicate with the data processing system via the I/O interface based on the second I/O device driver. The I/O interface can include a USB I/O interface, and the first I/O device driver can include a predefined USB class driver. The first device identification information identifies the peripheral device as corresponding to the predefined USB class driver. The second I/O device driver includes a custom USB driver. The controller is configured to communicate the custom USB driver to the data processing system via the I/O interface based on the predefined USB class driver, and the second device identification information identifies the peripheral device as corresponding to the custom USB driver.

In some further embodiments of the present invention, the predefined USB class driver includes a USB storage class driver, the first device identification information identifies the peripheral device as a storage device that corresponds to the USB storage class driver, and the controller is configured to communicate the custom USB driver to the data processing system via the I/O interface based on the USB storage class driver. The controller can be configured to communicate the first device identification information to the data processing system based on an indication that the data processing system does not have an I/O device driver that corresponds to the second device identification information. The controller can be configured to communicate the second device identification information from the peripheral device to the data processing system, to determine whether the data processing system has an I/O device driver that corresponds to the second device identification information, and to communicate the first device identification information to the data processing system based on the determination.

Some other embodiments of the present invention provide a computer program product for loading an I/O device driver from a peripheral device to a data processing system. The computer program product includes program code embodied in a computer-readable storage medium. The computer program code includes program code that is configured to communicate first device identification information from the peripheral device to the data processing system, where the first device identification information corresponds to a first I/O device driver in the data processing system. The computer program code also includes program code that is configured to communicate a second I/O device driver from the peripheral device to the data processing system based on the first I/O device driver in the data processing system, and program code that is configured to communicate second device identification information from the peripheral device to the data processing system. The second device identification information corresponds to the second I/O device driver.

In some further embodiments of the present invention, the computer program code also includes program code that is configured to carry out further communications between the peripheral device and the data processing system based on the second I/O device driver. The first device identification information can correspond to a predefined USB class driver in the data processing system. The first device identification information can identify the peripheral device as corresponding to the predefined USB class driver. The second I/O device driver can include a custom USB driver. The program code that is configured to communicate a second I/O device driver is configured to communicate the custom USB driver to the data processing system based on the predefined USB class driver. The second device identification information identifies the peripheral device as corresponding to the custom USB driver.

In some further embodiments of the present invention, the computer program code also includes program code that is configured to communicate the first device identification information to the data processing system based on a determination that the data processing system does not have an I/O device driver that corresponds to the second device identification information.

BRIEF DESCRIPTION OF THE DRAWINGS

FIG. 3 is a flow chart that illustrates operations for loading a USB device driver from a peripheral device to a data processing system according to some embodiments of the present invention.

FIG. 4 is a flow chart that illustrates more general operations for loading an I/O device driver from a peripheral device to a data processing system according to some embodiments of the present invention.

DETAILED DESCRIPTION

Figure 1:
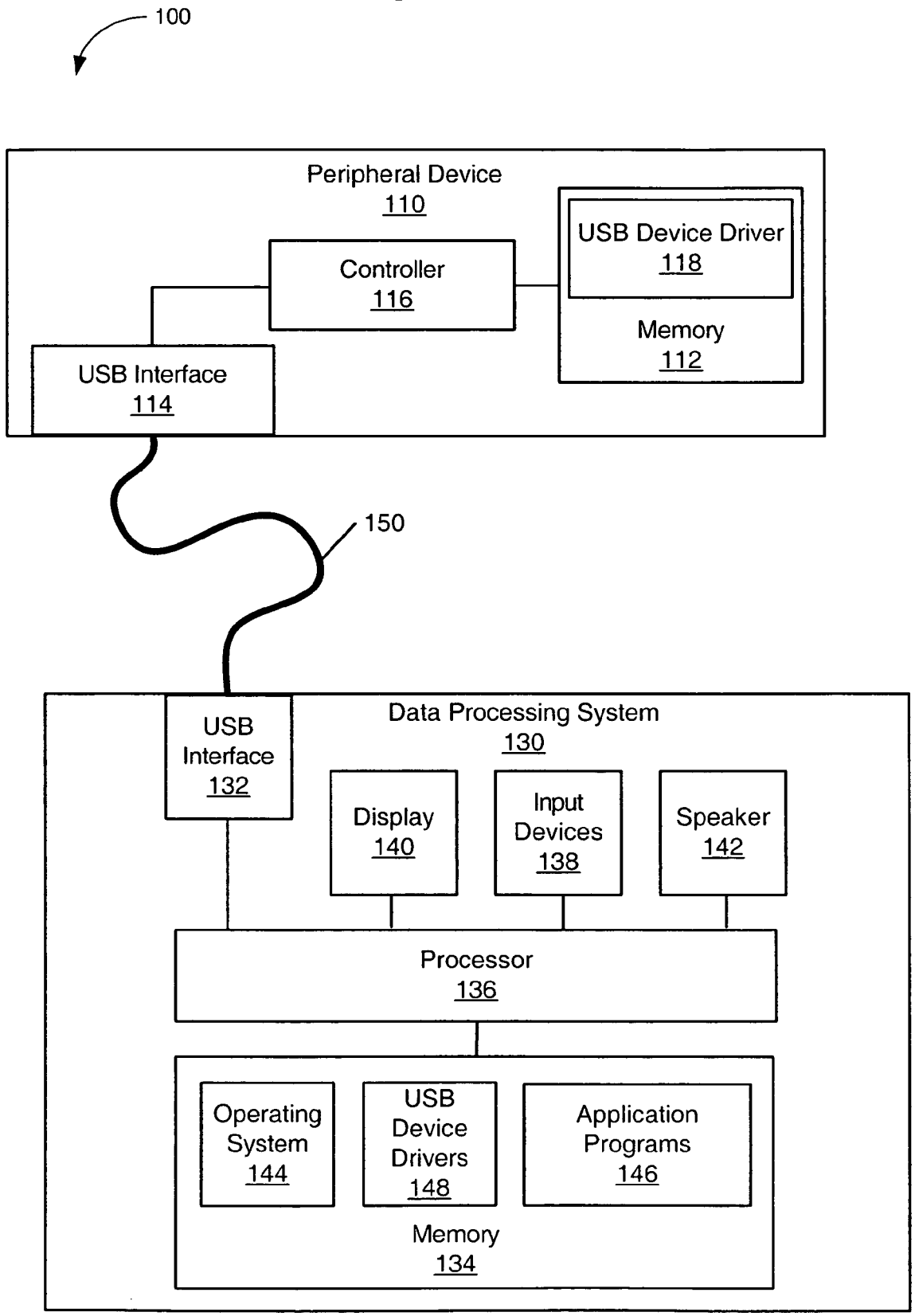
FIG. 1 is a block diagram of an electronic system that includes a peripheral device and a data processing system suitable for use in various embodiments of the present invention.

The present invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by those of skill in the art, the present invention may be embodied as methods, peripheral devices, and/or computer program products. Accordingly, the present invention may take the form of an entirely hardware embodiment, an entirely software embodiment or an embodiment combining software and hardware aspects. Furthermore, the present invention may take the form of a computer program product on a computer-usable storage medium having computer-usable program code embodied in the medium. Any suitable computer readable medium may be utilized including hard disks, CD-ROMs, optical storage devices, transmission media such as those supporting the Internet or an intranet, or magnetic storage devices.

Computer program code for carrying out operations of the present invention may be written in an object oriented programming language such as Java®, Smalltalk or C++. However, the computer program code for carrying out operations of the present invention may also be written in conventional procedural programming languages, such as the "C" programming language. The program code may execute entirely on the user's computer, partly on the user's computer, as a stand-alone software package, partly on the user's computer and partly on a remote computer/peripheral device or entirely on the remote computer/peripheral device.

The present invention is described below with reference to flowchart illustrations and/or block diagrams of methods, peripheral devices, data processing systems, and computer program products according to embodiments of the invention. As used herein, the term "data processing system" can include a computer and/or other system/device that be configured to perform the operations/acts as described herein. In some alternate implementations, the operations/acts noted in the blocks may occur out of the order noted in the operational illustrations. For example, two blocks shown in succession may in fact be executed substantially concurrently or the blocks may sometimes be executed in the reverse order, depending upon the operations/acts involved.

It will be understood that each block of the flowchart illustrations and/or block diagrams, and combinations of blocks in the flowchart illustrations and/or block diagrams, can be implemented by computer program instructions. These computer program instructions may be provided to a general purpose processor, special purpose processor, or other programmable data processing device to produce a machine, such that the instructions, which execute via the processor of the computer or other data processing system, create means for implementing the functions/acts specified in the flowchart and/or block diagram block or blocks.

These computer program instructions may also be stored in, or loaded onto, a computer-readable memory that can direct a computer or other data processing system to function in a particular manner, such that the instructions stored in, or loaded onto, the computer-readable memory produce an article of manufacture including instruction means which implement the function/act specified in the flowchart and/or block diagram block or blocks.

It also will be understood that, as used herein, the term "comprising" or "comprises" is open-ended, and includes one or more stated elements, steps and/or functions without precluding one or more unstated elements, steps and/or functions.

Various embodiments of the present invention will now be described with reference to the schematic block diagram of FIG. 1 that illustrates an exemplary electronic system 100 that includes a peripheral device 110 and a data processing system 130 that communicate via USB Interfaces 114 and 132 and a USB cable 150. These embodiments are described in the context of USB communications for purposes of illustration only. It is to be understood that the methods, peripheral devices, and/or computer program products of the present invention may be used with other types of communications without departing from the scope of the present invention. Accordingly, the term "USB" as used herein may be replaced by the general term "Input/Output" (I/O) without departing from the scope of the present invention. It should be further understood, that, as used herein, the term "peripheral device" may include any electronic device that may be communicatively connected to a data processing system, including, but not limited to, a printer, scanner, storage device, digital camera/video device, PDA, and/or a computer or other data processing system. Moreover, the communication connection between a peripheral device and a data processing system may be a wireless connection, including, but not limited to, Bluetooth, wireless LAN (e.g., 802.11), and/or another radio or optical interface.

As illustrated in FIG. 1, the peripheral device 110 can include a memory 112 and USB interface 114 that communicate with a controller 116. The memory 112 is representative of the overall hierarchy of memory devices containing the software and data used to implement the functionality of the peripheral device 110. The USB interface 114 can be used to transfer information between the peripheral device 110 and another USB compatible device, such as the data processing system 130 through the USB cable 150. Although the USB Interface 114, the controller 116, and the memory 112 are shown as separate blocks for purposes of illustration, one or more of them may be combined without departing from the scope of the present invention.

The data processing system 130 can include a memory 134 and USB interface 132 that communicate with a processor 136. The processor 136 can be any commercially available or custom microprocessor, or a programmable logic device. The data processing system 130 may further include an input device(s) 138 such as a keyboard or keypad, a display 140, and a speaker 142 that also communicate with the processor 136. The USB interface 132 may be similar to the USB interface 114 in the peripheral device 110, except that, according to some embodiments of the present invention, it is configured to serve as a host for USB communications while the USB interface 114 is configured to serve as a slave. These components may be conventional components, such as those used in many conventional data processing systems, which may be configured to operate as described herein.

The memory 134 is representative of the overall hierarchy of memory devices containing the software and data used to implement the functionality of the data processing system 130. As shown in FIG. 1, the memory 134 may include several categories of software and data used in the data processing system 130: an operating system 144; application programs 146; and USB device drivers 148. As will be appreciated by those of skill in the art, the operating system 144 may be any operating system suitable for communicating via a USB interface with peripheral devices, such as, for example, OS/2, Windows95, Windows98, Windows2000 or WindowsXP from Microsoft Corporation, Redmond, Wash., Unix or Linux. The application programs 146 are illustrative of the programs that implement the various features of the data processing system 130 and preferably include at least one application which supports operations according to embodiments of the present invention.

The USB device drivers 148 typically include software routines accessed through the operating system 144 to allow the application programs 146 to communicate with peripheral devices. The USB device drivers 148 may include USB class device drivers that correspond to predefined classes of USB peripheral devices (e.g., storage device, human interface device, printing device). The USB device drivers 148 may also include custom USB custom device drivers, which may have been previously installed by an enumeration process, and which correspond to predefined USB peripheral devices.

According to embodiments of the present invention, the peripheral device 110 includes a USB device driver, which may be a custom USB device driver for the peripheral device 110. When the data processing system 130 does not have a USB device driver that corresponds to (e.g., is compatible with) the peripheral device 110, the USB device driver in the peripheral device 110 can be loaded into the data processing system 130 via the USB cable 150. In particular, as will be described further below, the controller 116 can be configured to communicate first device identification information to the data processing system 130, where the first device identification information can correspond to a first I/O device driver in the data processing system 130. The controller 116 can be configured to then communicate a second I/O device driver to the data processing system using the first I/O device driver in the data processing system 130. The controller 116 can be configured to then communicate second device identification information to the data processing system 130, where the second device identification information corresponds to the second I/O device driver.

The loading of an USB device driver from the peripheral device 110 into the data processing system 130 via the USB cable 150 will now be described with reference to FIGS. 1 and 3 in accordance with some embodiments of the present invention. When the data processing system 130 detects, via the cable 150, that the peripheral device 110 has been plugged into, or powered-up on, the USB interface 132, it requests identification information from the peripheral device 110 using what may be an USB enumeration process.

At Block 300, the peripheral device 110 communicates custom device identification information to the data processing system 130. The custom device identification information may, for example, identify the class, vendor, and/or model number of the peripheral device 110. At Block 310, a decision is made as to whether the data processing system 130 has an existing USB device driver that corresponds to the custom device identification information. The data processing system 130 may have an existing USB device driver that corresponds to the custom device identification information because, for example, the USB device driver 118 has previously been loaded from the peripheral device 110. When an existing USB device driver that corresponds to the peripheral device 110 is present in the data processing system 130, at Block 320 the data processing system 130 and the peripheral device 110 communicate based on the existing USB device driver.

Figure 2:
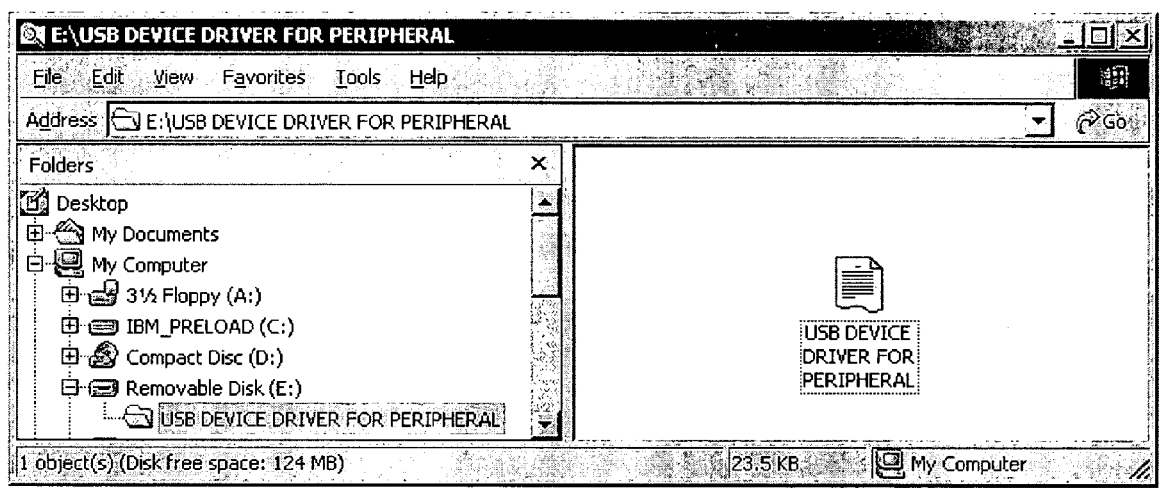
FIG. 2 depicts an window that displays an executable file on a peripheral device, and which may be executed to load a custom USB device driver from the peripheral device according to some embodiments of the present invention.

When an existing USB device driver is determined at Block 310 to not be present in the data processing system 130, then at Block 330 the peripheral device 110 communicates class device identification information to the data processing system 130. The class device identification information may identify the peripheral device 110 as a storage device class device that corresponds to an existing USB storage class driver among the USB device drivers 148 in the memory 134. Accordingly, the class device identification information may be selected to likely correspond to one of the existing USB device drivers 148. At Block 340, based on the storage device class device identification, the data processing system 130 may display on the display 140 a window in which the USB device driver 118 in the peripheral device 110 is displayed to a user. FIG. 2 depicts a Windows Explorer window that displays an executable file titled "USB DEVICE DRIVER FOR PERIPHERAL" that may be the USB device driver 118 located in the memory 112. A user may select and execute the executable file to install a custom USB device driver, which corresponds to the peripheral device 110, in the memory 134 of the data processing system 130. The custom USB device driver may be added to the list of USB device drivers 148. The communications between the peripheral device 110 and the data processing system 130 during the operations of Blocks 330 and 340 and, in particular, between the USB interfaces 114 and 132 when transferring the custom USB device driver, may be based on one of the existing USB class device drivers in the data processing system 130 which corresponds to the class device identification information from the peripheral device 110.

At Block 350, the peripheral device 110 communicates custom device identification information to the data processing system 130. Based on the custom device identification information, the data processing system 130 can now find and use the custom USB device driver in the memory 134 to communicate with the peripheral device 110.

Referring now to FIGS. 1 and 4, the loading of an I/O device driver, such as a USB device driver, from the peripheral device 110 to the data processing system 130 is described in accordance with some more general embodiments of the present invention. One difference between the operations in FIGS. 3 and 4 is that according to the embodiment shown in FIG. 3, the peripheral device 110 loads a new USB device driver into the data processing system 130 based on a determination that the data processing system 130 does not have an existing USB device driver that corresponds to the peripheral device 110.

At Block 400, the peripheral device 110 communicates first device identification information to the data processing system 130. The first device identification information may be selected to likely correspond to a first I/O device driver in the data processing system 130. At Block 410 the peripheral device 110 communicates a second I/O device driver to the data processing system 130 using the first I/O device driver in the data processing system 130. At Block 420, the peripheral device 110 communicates second device identification information to the data processing system 130 that corresponds to the second I/O device driver. The second I/O device driver may be further configured by the data processing system 130 for use with the peripheral device 110. The data processing system 130 may then communicate with the peripheral device 110 based on the second I/O device driver.

In the drawings and specification, there have been disclosed typical illustrative embodiments of the invention and, although specific terms are employed, they are used in a generic and descriptive sense only and not for purposes of limitation, the scope of the invention being set forth in the following claims.

That which is claimed is:

1. A method of loading an I/O device driver from a peripheral device to a data processing system, the method comprising:
communicating first device identification information from the peripheral device to the data processing system that identifies the peripheral device as corresponding to a first I/O device driver in the data processing system;
communicating a second I/O device driver from the peripheral device to the data processing system using the first I/O device driver in the data processing system; and communicating second device identification information, which is different from the first device identification information, from the peripheral device to the data processing system that identifies the peripheral device as corresponding to the second I/O device driver.

2. The method of claim 1, further comprising carrying out further communications between the peripheral device and the data processing system using the second I/O device driver.

3. The method of claim 1, wherein the first I/O device driver in the data processing system comprises a predefined USB class driver, and wherein:
the communicated first device identification information identifies the peripheral device as corresponding to the predefined USB class driver in the data processing system;
communicating the second I/O device driver comprises communicating a custom USB driver to the data processing system using the predefined USB class driver; and
the communicated second device identification information, which is different from the first device identification information, identifies the peripheral device as corresponding to the custom USB driver in the data processing system.

4. The method of claim 3, wherein:
the predefined USB class driver comprises a USB storage class driver; and
the first device identification information identifies the peripheral device as a storage device that corresponds to the USB storage class driver; and
the custom USB driver is communicated to the data processing system using the USB storage class driver.

5. The method of claim 3, wherein communicating the custom USB driver to the data processing system comprises installing the custom USB driver into a memory of the data processing system.

6. The method of claim 3, wherein communicating the custom USB driver to the data processing system comprises:
loading an executable file from the peripheral device into the data processing system; and
running the executable file to install the custom USB driver into a memory of the data processing system.

7. The method of claim 3, wherein communicating the custom USB driver to the data processing system comprises:
displaying to a user an executable file that is on the peripheral device; and
causing the executable file to be executed by the data processing system based on one or more selections by a user, wherein the executable file installs the custom USB driver in the data processing system.

8. The method of claim 3, wherein:
the predefined USB class driver comprises a USB storage class driver;
the first device identification information identifies the peripheral device as a storage device that corresponds to the USB storage class driver; and
communicating the custom USB driver to the data processing system comprises:
displaying to a user an executable file that is on the peripheral device in a window formed by an operating system within the data processing system; and
causing the executable file to be executed by the data processing system based on a selection by a user, wherein the executable file installs the custom USB driver in the data processing system.

9. The method of claim 1, wherein the peripheral device communicates the first device identification information to the data processing system based on a determination that the data processing system does not have an I/O device driver that corresponds to the second device identification information.

10. The method of claim 1, further comprising:
communicating the second device identification information from the peripheral device to the data processing system; and
determining whether the data processing system has an I/O device driver that corresponds to the second device identification information, wherein the first device identification information is communicated to the data processing system based on the determination.

11. A peripheral device comprising:
an I/O interface that is configured to communicate information to a data processing system; and
a controller that is configured to communicate first device identification information to a data processing system via the I/O interface, wherein the first device identification information identifies the peripheral device as corresponding to a first I/O device driver in the data processing system, and the controller is configured to communicate a second I/O device driver to the data processing system via the I/O interface based on the first I/O device driver in the data processing system, and is configured to communicate second device identification information, which is different from the first device identification information, to the data processing system via the I/O interface, wherein the second device identification information identifies the peripheral device as corresponding to the second I/O device driver.

12. The peripheral device of claim 11, wherein the controller is configured to communicate with the data processing system via the I/O interface based on the second I/O device driver.

13. The peripheral device of claim 11, wherein:
the I/O interface comprises a USB I/O interface;
the first I/O device driver comprises a predefined USB class driver;
the first device identification information identifies the peripheral device as corresponding to the predefined USB class driver;
the second I/O device driver comprises a custom USB driver;
the controller is configured to communicate the custom USB driver to the data processing system via the I/O interface based on the predefined USB class driver; and
the second device identification information, which is different from the first device identification information, identifies the peripheral device as corresponding to the custom USB driver.

14. The peripheral device of claim 13, wherein:
the predefined USB class driver comprises a USB storage class driver;
the first device identification information identifies the peripheral device as a storage device that corresponds to the USB storage class driver; and
the controller is configured to communicate the custom USB driver to the data processing system via the I/O interface based on the USB storage class driver.

15. The peripheral device of claim 11, wherein the controller is configured to communicate the first device identification information to the data processing system based on an indication that the data processing system does not have an I/O device driver that corresponds to the second device identification information.

16. The peripheral device of claim 11, wherein the controller is configured to communicate the second device identification information from the peripheral device to the data processing system, and is configured to determine whether the data processing system has an I/O device driver that corresponds to the second device identification information, and is configured to communicate the first device identification information to the data processing system based on the determination.

17. A computer program product for loading an I/O device driver from a peripheral device to a data processing system, the computer program product comprising a computer-readable storage medium having computer-readable program code embodied in the medium, the computer-readable storage medium comprising:

computer-readable program code that, when executed by a processor, is configured to communicate first device identification information from the peripheral device to the data processing system, that identifies the peripheral device as corresponding to a first I/O device driver in the data processing system;

computer-readable program code that, when executed by a processor, is configured to communicate a second I/O device driver from the peripheral device to the data processing system based on the first I/O device driver in the data processing system; and computer-readable program code that, when executed by a processor, is configured to communicate second device identification information, which is different from the first device identification information, from the peripheral device to the data processing system, that identifies the peripheral device as corresponding to the second I/O device driver.

18. The computer program product according to claim 17, further comprising program code that, when executed by a processor, is configured to carry out further communications between the peripheral device and the data processing system based on the second I/O device driver.

19. The computer program product according to claim 17, wherein:

the first device identification information corresponds to a predefined USB class driver in the data processing system;

the first device identification information identifies the peripheral device as corresponding to the predefined USB class driver;

the second I/O device driver comprises a custom USB driver;

the program code that is configured to communicate a second I/O device driver is configured to communicate the custom USB driver to the data processing system based on the predefined USB class driver; and the second device identification information, which is different from the first device identification information, identifies the peripheral device as corresponding to the custom USB driver.

20. The computer program product according to claim 17, further comprising:

computer-readable program code that, when executed by a processor, is configured to communicate the first device identification information to the data processing system based on a determination that the data processing system does not have an I/O device driver that corresponds to the second device identification information.

* * * * *